(12) United States Patent
Won et al.

(10) Patent No.: US 9,778,510 B2
(45) Date of Patent: Oct. 3, 2017

(54) NANOCRYSTAL POLYMER COMPOSITES AND PRODUCTION METHODS THEREOF

(71) Applicant: SAMSUNG ELECTRONICS CO., LTD., Suwon-si, Gyeonggi-do (KR)

(72) Inventors: Na Youn Won, Suwon-si (KR); Hyun A Kang, Suwon-si (KR); Eun Joo Jang, Suwon-si (KR); Shin Ae Jun, Seongnam-si (KR); Oul Cho, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 254 days.

(21) Appl. No.: 14/503,764

(22) Filed: Oct. 1, 2014

(65) Prior Publication Data
US 2015/0098212 A1    Apr. 9, 2015

(30) Foreign Application Priority Data

Oct. 8, 2013  (KR) .................. 10-2013-0120151
Sep. 30, 2014  (KR) .................. 10-2014-0131933

(51) Int. Cl.
| | |
|---|---|
| H01B 1/12 | (2006.01) |
| G02F 1/1335 | (2006.01) |
| C09K 11/00 | (2006.01) |
| F21V 8/00 | (2006.01) |

(52) U.S. Cl.
CPC ........ *G02F 1/133615* (2013.01); *C09K 11/00* (2013.01); *G02B 6/005* (2013.01); *G02F 2001/133614* (2013.01); *Y10S 977/774* (2013.01)

(58) Field of Classification Search
CPC ...... G02B 6/0026; C09K 11/02–11/025; Y10S 977/774
USPC ............... 362/84; 252/519.3, 519.33, 301.36
See application file for complete search history.

(56) References Cited

U.S. PATENT DOCUMENTS

| | | |
|---|---|---|
| 7,645,402 B2 | 1/2010 | Choi et al. |
| 8,076,410 B2 | 12/2011 | Nayfeh et al. |
| 8,249,409 B2 | 8/2012 | Zhang et al. |
| 8,648,130 B2 | 2/2014 | Hasegawa et al. |
| 8,847,197 B2 | 9/2014 | Pickett et al. |
| 9,365,701 B2 | 6/2016 | Nick et al. |
| 9,570,549 B2 | 2/2017 | Jang et al. |

(Continued)

FOREIGN PATENT DOCUMENTS

| | | |
|---|---|---|
| CN | 102482077 A | 5/2012 |
| CN | 102482457 A | 5/2012 |

(Continued)

OTHER PUBLICATIONS

Korean Office Action dated Apr. 7, 2015 and its English Translation.
Chinese Office Action dated Aug. 1, 2017, issued for the corresponding Chinese Patent Application No. 201410525122.2.

*Primary Examiner* — Sean Gramling
(74) *Attorney, Agent, or Firm* — Cantor Colburn LLP

(57) ABSTRACT

A semiconductor nanocrystal composition including a semiconductor nanocrystal, an organic additive, and at least one polymerizable substance selected from a polymerizable monomer, a polymerizable oligomer, and a combination thereof, wherein the composition has haze of greater than or equal to about 40% after polymerization.

25 Claims, 13 Drawing Sheets

(56) References Cited

U.S. PATENT DOCUMENTS

| | | | |
|---|---|---|---|
| 2007/0001182 A1* | 1/2007 | Schardt | C09K 11/02 257/98 |
| 2008/0149164 A1* | 6/2008 | Goedmakers | C08L 69/005 136/247 |
| 2011/0068321 A1 | 3/2011 | Pickett et al. | |
| 2011/0084250 A1 | 4/2011 | Jang et al. | |
| 2012/0001217 A1 | 1/2012 | Kang et al. | |
| 2012/0113671 A1 | 5/2012 | Sadasivan et al. | |
| 2012/0113672 A1 | 5/2012 | Dubrow et al. | |
| 2013/0105854 A1 | 5/2013 | Jange et al. | |
| 2013/0169904 A1 | 7/2013 | Kang et al. | |
| 2015/0048311 A1 | 2/2015 | Pickett et al. | |
| 2017/0152436 A1 | 6/2017 | Jang et al. | |

FOREIGN PATENT DOCUMENTS

| | | |
|---|---|---|
| CN | 103080081 A | 5/2013 |
| JP | 2008-036867 A | 2/2008 |
| JP | 2008-036868 A | 2/2008 |
| JP | 5059681 B2 | 8/2012 |
| KR | 1020070052047 A | 5/2007 |
| KR | 1020100085152 A | 7/2010 |
| KR | 1020110039156 A | 4/2011 |
| KR | 10-1100382 B1 | 12/2011 |
| KR | 1020120062902 A | 6/2012 |
| KR | 1020130046881 A | 5/2013 |
| KR | 1020130077576 A | 7/2013 |
| KR | 10-1392061 B1 | 4/2014 |

\* cited by examiner

NANOCRYSTAL POLYMER COMPOSITES AND PRODUCTION METHODS THEREOF

CROSS-REFERENCE TO RELATED APPLICATION

This application claims priority to and the benefit of Korean Patent Application Nos. 10-2013-0120151 and 10-2014-0131933 filed on Oct. 8, 2013 and Sep. 30, 2014, and all the benefits accruing therefrom under 35 U.S.C. §119, the content of which is incorporated herein in its entirety by reference.

BACKGROUND

1. Field

Nanocrystal-polymer composites and production methods thereof are disclosed.

2. Description of the Related Art

Unlike emissive displays such as a plasma display panel (PDP) and a field emission display unit (FED), liquid crystal displays (LCDs) are non-emissive display units that cannot emit light by themselves and require incident light from outside to form an image. Therefore, the LCD has a backlight unit that is located at its rear side so as to emit light.

The backlight unit for the LCD used a cold cathode fluorescent lamp (CCFL) as a light source. However, using the CCFL has disadvantages in that uniform brightness may not be ensured and color purity may decrease as the size of the LCD becomes larger.

In recent years, a backlight unit using a three color LED as a light source has been developed. The unit may reproduce high color purity and thus may find utility in a high quality display unit. However, the backlight unit using the three color LED is far more expensive than the CCFL, and in order to overcome such drawback, many researchers have focused on developing a white LED that may convert light from a single color LED chip to output white light.

The white LED may secure profitability, but it has disadvantageously poor color purity and a low level of color reproducibility in comparison with the three color LED. Accordingly, attempts have been made to use semiconductor nanocrystals as a material for a light converting layer in the LED in order to enhance color reproducibility and color purity and to have price competitiveness.

SUMMARY

An embodiment is directed to a semiconductor nanocrystal composition that may produce a semiconductor-polymer composite having excellent brightness and stability.

Another embodiment is directed to a semiconductor-polymer composite having excellent brightness and stability.

Another embodiment is directed to a backlight unit having excellent brightness and stability.

According to an embodiment, a semiconductor nanocrystal composition includes
a semiconductor nanocrystal,
an organic additive, and
at least one polymerizable substance selected from a polymerizable monomer, a polymerizable oligomer, and a combination thereof,
wherein the composition has haze of greater than or equal to about 40% after polymerization.

The polymerizable substance may include the polymerizable monomer and the polymerizable oligomer.

The semiconductor nanocrystals may include a Group II-VI compound, a Group III-V compound, a Group IV-VI compound, a Group IV element or compound, or a combination thereof.

The Group II-VI compound may be selected from:
a binary element compound selected from CdSe, CdTe, ZnS, ZnSe, ZnTe, ZnO, HgS, HgSe, HgTe, MgSe, MgS, and a combination thereof;
a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and
a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound may be selected from:
a binary element compound selected from GaN, GaP, GaAs, GaSb, AlN, AlP, AlAs, AlSb, InN, InP, InAs, InSb, and a combination thereof;
a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and
a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from:
a binary element compound selected from SnS, SnSe, SnTe, PbS, PbSe, PbTe, and a combination thereof;
a ternary element compound selected from SnSeS, SnSeTe, SnSTe, PbSeS, PbSeTe, PbSTe, SnPbS, SnPbSe, SnPbTe, and a combination thereof; and
a quaternary element compound selected from SnPbSSe, SnPbSeTe, SnPbSTe, and a combination thereof.

The Group IV element or compound may be selected from:
a singular element selected from Si, Ge, and a combination thereof; and
a binary element compound selected from SiC, SiGe, and a combination thereof.

The semiconductor nanocrystal may have a core-shell structure.

The semiconductor nanocrystal may have a quantum yield of greater than or equal to about 50%.

The semiconductor nanocrystal may have a full width at half maximum of less than or equal to about 45 nanometers.

The semiconductor nanocrystal may include a surface organic compound,
wherein an amount of the surface organic compound may be less than or equal to about 35% by weight based on the total weight of the semiconductor nanocrystal,
wherein the surface organic compound includes a ligand compound, a solvent, or a combination thereof.

An amount of the semiconductor nanocrystal in the composition may be less than or equal to about 20% by weight based on a total weight of the polymerizable substance.

The organic additive may include an amine having at least one C8 to C30 alkyl group or C8 to C30 alkenyl group, a phosphine having at least one C8 to C30 alkyl group or C8 to C30 alkenyl group, a phosphine oxide having at least one C8 to C30 alkyl group or C8 to C30 alkenyl group, or a combination thereof.

An amount of the organic additive in the semiconductor nanocrystal composition may be from about 0.05% by weight to about 10% by weight based on the total weight of the polymerizable substance.

The polymerizable monomer and the polymerizable oligomer may include a combination of a first monomer having at least two thiol groups at its terminal ends and a second monomer having at least two carbon-carbon unsaturated bond-containing groups at its terminal ends, an acrylate monomer, an acrylate oligomer, a methacrylate monomer, a methacrylate oligomer, a urethane acrylate monomer, a urethane acrylate oligomer, an epoxy monomer, an epoxy oligomer, a silicone monomer, or a silicone oligomer.

The first monomer having at least two thiol groups at its terminal ends may be represented by the following Chemical Formula 1.

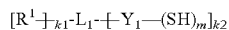  Chemical Formula 1

In Chemical Formula 1, $R^1$ is hydrogen, a substituted or unsubstituted linear or branched C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, a substituted or unsubstituted C2 to C30 alkynyl group, a substituted or unsubstituted C3 to C30 alicyclic organic group including a double bond or triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, —NH$_2$, a substituted or unsubstituted C1 to C60 amine group (—NRR', wherein R and R' are each independently a linear or branched C1 to C30 alkyl group), an isocyanurate group, a (meth)acrylate group, a halogen, —ROR' (wherein R is a substituted or unsubstituted C1 to C20 alkylene group and R' is hydrogen or a linear or branched C1 to C20 alkyl group), —C(=O)OR' (wherein R' is hydrogen or a linear or branched C1 to C20 alkyl group) —CN, or —C(=O)ONRR' (wherein R and R' are each independently hydrogen or a linear or branched C1 to C20 alkyl group);

$L_1$ is a single bond, a carbon atom, a substituted or unsubstituted C1 to C30 alkylene group, a substituted or unsubstituted C1 to C30 cycloalkylene group, a substituted or unsubstituted C1 to C30 cycloalkenylene group, a substituted or unsubstituted C6 to C30 arylene group, or a substituted or unsubstituted C3 to C30 heteroarylene group;

$Y_1$ is a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene group is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), —NR— (wherein R is hydrogen or a linear or branched C1 to C10 alkyl group), or a combination thereof;

m is an integer of 1 or more;

k1 is 0 or an integer of 1 or more;

k2 is an integer of 1 or more; and the sum of m and k2 is an integer of 3 or more, provided that m does not exceed the valence of $Y_1$, and provided that the sum of k1 and k2 does not exceed the valence of $L_1$.

The second monomer may be represented by the following Chemical Formula 2:

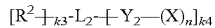  Chemical Formula 2

In Chemical Formula 2,

X is a C2 to C30 aliphatic organic group including a carbon-carbon unsaturated bond, a C6 to C30 aromatic organic group including a carbon-carbon double bond or a carbon-carbon triple bond, or a C3 to C30 alicyclic organic group including a carbon-carbon double bond or a carbon-carbon triple bond;

$R^2$ is hydrogen, a substituted or unsubstituted linear or branched C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, a substituted or unsubstituted C2 to C30 alkynyl group, a substituted or unsubstituted C3 to C30 alicyclic organic group including a double bond or triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, —NH$_2$, a substituted or unsubstituted C1 to C60 amine group (—NRR', wherein R and R' are each independently a linear or branched C1 to C30 alkyl group), an isocyanate group, an isocyanurate group, a (meth)acryloxy group, a halogen, —ROR' (wherein R is a substituted or unsubstituted C1 to C20 alkylene group and R' is hydrogen or a linear or branched C1 to C20 alkyl group), an acyl halide group (—RC(=O)X, wherein R is a substituted or unsubstituted alkylene group and X is a halogen), —C(=O)OR' (wherein R' is hydrogen or a linear or branched C1 to C20 alkyl group), —CN, or —C(=O)ONRR' (wherein R and R' are each independently hydrogen or a linear or branched C1 to C20 alkyl group);

$L_2$ is a single bond, a carbon atom, a substituted or unsubstituted C1 to C30 alkylene group, a substituted or unsubstituted C6 to C30 arylene group, or a substituted or unsubstituted C3 to C30 heteroarylene group;

$Y_2$ is a single bond, a substituted or unsubstituted C1 to C30 alkylene group, a substituted or unsubstituted C2 to C30 alkenylene group, or a C1 to C30 alkylene group or a C2 to C30 alkenylene group, wherein at least one methylene group is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), —NR— (wherein R is hydrogen or a linear or branched C1 to C10 alkyl group), or a combination thereof;

n is an integer of 1 or more;

k3 is an integer of 0 or more;

k4 is an integer of 1 or more; and the sum of n and k4 is an integer of 3 or more, provided that n does not exceed the valence of $Y_2$, and provided that the sum of k3 and k4 does not exceed the valence of $L_2$.

The polymerizable monomer and the polymerizable oligomer may have a hydrophilic moiety.

In an embodiment, the semiconductor nanocrystal composition does not include an inorganic oxide.

In other embodiment, the semiconductor nanocrystal composition may further include an inorganic oxide. The inorganic oxide may be in the form of a particle.

The inorganic oxide may be selected from silica, alumina, titania, zirconia, zinc oxide, and a combination thereof.

The inorganic oxide may be included in an amount of greater than or equal to about 1% by weight, based on the total weight of the composition.

The inorganic oxide may be included in an amount of less than or equal to about 20% by weight, or less than or equal to about 15% by weight, based on the total weight of the composition.

In another embodiment, a semiconductor nanocrystal-polymer composite includes
  a semiconductor nanocrystal,
  an organic additive, and
  a polymerization product of at least one polymerizable substance selected from a polymerizable monomer, a polymerizable oligomer, and a combination thereof,
  wherein the composite has a haze of greater than or equal to about 40%.

The semiconductor nanocrystal may include a Group II-VI compound, a Group III-V compound, a Group IV-VI compound, a Group IV element or compound, or a combination thereof.

The semiconductor nanocrystal may emit a green light or a red light.

The organic additive may be an amine having at least one C8 to C30 alkyl group or C8 to C30 alkenyl group, a phosphine having at least one C8 to C30 alkyl group or C8 to C30 alkenyl group, a phosphine oxide having at least one C8 to C30 alkyl group or C8 to C30 alkenyl group, or a combination thereof.

An amount of the organic additive in the semiconductor nanocrystal-polymer composite may be about 0.05% by weight to about 10% by weight based on the total weight of the polymerizable substance.

The polymerizable monomer may include a combination of a first monomer having at least two thiol groups at its terminal ends and a second monomer having at least two carbon-carbon unsaturated bond-containing groups at its terminal ends, an acrylate monomer, a methacrylate monomer, a urethane acrylate monomer, an epoxy monomer, a silicone monomer, or a combination thereof, and the polymerizable oligomer may include a acrylate oligomer, a methacrylate oligomer, a urethane (meth)acrylate oligomer, an epoxy oligomer, a silicone oligomer, or a combination thereof.

In an embodiment, the semiconductor nanocrystal-polymer composite does not include an inorganic oxide (e.g., an inorganic oxide particle).

In other embodiments, the semiconductor nanocrystal-polymer composite may further include an inorganic oxide. The inorganic oxide may be in the form of a particle.

The inorganic oxide may be selected from silica, alumina, titania, zirconia, zinc oxide, and a combination thereof. The inorganic oxide may be included in an amount of about 1% by weight to about 20% by weight, based on the total weight of the composite.

In another embodiment, a backlight unit for a liquid crystal display includes:
  a LED light source; and
  a light conversion layer disposed separately from the LED light source to convert light emitted from the LED light source to white light and to provide the white light to a liquid crystal panel,
  wherein the light conversion layer includes the aforementioned semiconductor nanocrystal-polymer composite.

The backlight unit may further include a light guide panel disposed between the LED light source and the light conversion layer.

The backlight unit may further include a diffusion plate on a light guide panel, and the light conversion layer may be disposed between the light guide panel and the diffusion plate, or on a side of the diffusion plate opposite to the light guide panel.

The light conversion layer may include the aforementioned semiconductor nanocrystal-polymer composite film, and at least one of a first polymer film and a second polymer film disposed on at least one surface of the film, wherein the first polymer film and the second polymer film may each independently include a polyester, a cyclic olefin polymer, a polymerized product of the first monomer including at least two thiol groups, each located at the terminal end of the first monomer, and the second monomer including at least two unsaturated carbon-carbon bonds at the terminal end of the second monomer, or a combination thereof.

At least one of the first polymer film and the second polymer film may further include an inorganic oxide.

At least one of the first polymer film and the second polymer film may have an uneven pattern on a side opposite to the light conversion layer.

In another embodiment, a liquid crystal display device includes:
  an LED light source;
  a light conversion layer disposed separately from the LED light source to convert light emitted from the LED light source to white light and to provide the white light to the liquid crystal panel; and
  a liquid crystal panel for providing an image using light provided from the light conversion layer,
  wherein the light conversion layer includes the aforementioned semiconductor nanocrystal-polymer composite.

The liquid crystal display may further include a light guide panel disposed between the LED light source and the light conversion layer.

The aforementioned semiconductor nanocrystal composition and the semiconductor nanocrystal-polymer composite may exhibit high stability and enhanced brightness. The organic additive is included in a composition of colloidal semiconductor nanocrystals as synthesized. Then, the composition is subjected to removal of excess organic materials therefrom. As a result, in the semiconductor nanocrystal-polymer composite prepared from the resulting composition, aggregation of the nanocrystals may be effectively suppressed and the optical path length of a light source may increase so as to realize high brightness when the composite is applied to a display unit. In addition, regardless of the synthesis method of the semiconductor nanocrystals, the types and the amount of the organic material in the composite may be selected in a controllable manner so that reproducibility of the device may be secured.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
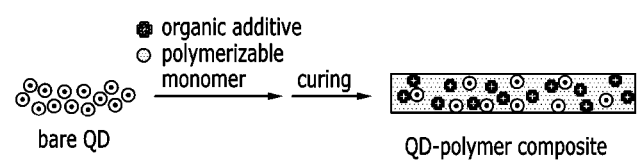
FIG. 1 schematically illustrates a production process of a semiconductor nanocrystal-polymer composite in accordance with an embodiment.

This disclosure will be described more fully hereinafter in the following detailed description, in which some but not all embodiments of this disclosure are described. This disclosure may be embodied in many different forms and is not be construed as limited to the embodiments set forth herein; rather, these embodiments are provided so that this disclosure will fully convey the scope of the invention to those skilled in the art. Thus, in some exemplary embodiments, well-known technologies are not specifically explained to avoid ambiguous understanding of the present inventive concept. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless specifically described to the contrary, a singular form includes a plural form.

In the drawings, the thickness of layers, films, panels, regions, etc., are exaggerated for clarity. Like reference numerals designate like elements throughout the specification.

It will be understood that when an element is referred to as being "on" another element, it can be directly on the other element or intervening elements may be present therebetween. In contrast, when an element is referred to as being "directly on" another element, there are no intervening elements present.

As used herein, when a definition is not otherwise provided, the term "substituted" refers to a compound or group wherein at least one of hydrogen atoms thereof is substituted with a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (e.g., —F, —Cl, —Br, or —I), a hydroxyl group (—OH), a nitro group (—NO$_2$), a cyano group (—CN), an amino group (—NRR', wherein R and R' are hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR wherein R is a C1 to C6 alkyl group or a C6 to C12 aryl group), a carboxyl group (—C(=O)OH) or a salt thereof (—C(=O)OM wherein M is an organic or inorganic cation), a sulfonic acid group (—SO$_3$H) or a salt thereof (—SO$_3$M wherein M is an organic or inorganic cation), and a phosphoric acid group (—PO$_3$H$_2$) or a salt thereof (—PO$_3$MH or —PO$_3$M$_2$ wherein M is an organic or inorganic cation).

As used herein, the term "hetero" refers to inclusion of one to four heteroatoms selected from the group consisting of N, O, S, Si, and P. The total number of ring members may be 3 to 10. If multiple rings are present, each ring is independently aromatic, saturated, or partially unsaturated, and multiple rings, if present, may be fused, pendant, spirocyclic, or a combination thereof. Heterocycloalkyl groups include at least one non-aromatic ring that contains a heteroatom ring member. Heteroaryl groups include at least one aromatic ring that contains a heteroatom ring member. Non-aromatic and/or carbocyclic rings may also be present in a heteroaryl group, provided that at least one ring is both aromatic and contains a ring member that is a heteroatom.

As used herein, the term "alkyl group" may refer to a straight or branched chain saturated aliphatic hydrocarbon group having the specified number of carbon atoms and having a valence of at least one.

As used herein, the term "alkenyl group" may refer a straight or branched chain hydrocarbon group that comprises at least one carbon-carbon double bond and having a valence of at least one, optionally substituted with one or more substituents where indicated, provided that the valence of the alkenyl group is not exceeded.

As used herein, the term "alkynyl" group may refer to a straight or branched chain, monovalent hydrocarbon group having at least one carbon-carbon triple bond.

As used herein, the term "aryl" group may refer to a cyclic group in which all ring members are carbon and at least one ring is aromatic, the group having the specified number of carbon atoms, and having a valence of at least one, optionally substituted with one or more substituents where indicated, provided that the valence of the aryl group is not exceeded. More than one ring may be present, and any additional rings may be independently aromatic, saturated or partially unsaturated, and may be fused, pendant, spirocyclic, or a combination thereof.

As used herein, the term "alkylaryl" group may refer to an alkyl group as defined above, covalently linked to a substituted or unsubstituted aryl group, as defined above, with the point of attachment to a compound on the aryl group.

As used herein, the term "alkoxy" group may refer to an alkyl group as defined above, linked via an oxygen, e.g. alkyl-O—.

As used herein, the term "aryloxy" group may refer to an aryl group as defined above, linked via an oxygen, e.g. aryl-O—.

As used herein, the term "cycloalkyl" group may refer to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the cycloalkyl group is not exceeded. Cycloalkyl groups do not include an aromatic ring or a heterocyclic ring. When the numbers of carbon atoms is specified (e.g., C3 to C15 cycloalkyl), the number means the number of ring members present in the one or more rings.

As used herein, the term "cycloalkenyl" group may refer to a monovalent group having one or more rings and one or more carbon-carbon double bond in the ring, wherein all ring members are carbon (e.g., cyclopentenyl and cyclohexenyl).

As used herein, the term "cycloalkynyl" group may refer to a stable aliphatic monocyclic or polycyclic group having at least one carbon-carbon triple bond, wherein all ring members are carbon (e.g., cyclohexynyl).

As used herein, the term "carbon-carbon unsaturated bond-containing group" may refer to a C2 to C20 alkenyl group including at least one carbon-carbon double bond, a C2 to C20 alkynyl group including at least one carbon-carbon triple bond, a C4 to C20 cycloalkenyl group including at least one carbon-carbon double bond in a ring, or a C4 to C20 cycloalkynyl group including at least one carbon-carbon triple bond in a ring.

As used herein, the term "heteroalkyl" group may refer to an alkyl group as defined above, that comprises at least one heteroatom covalently bonded to one or more carbon atoms of the alkyl group. Each heteroatom is independently chosen from N, O, S, Si, or P.

As used herein, the term "heteroaralkyl" may refer to an alkyl group as defined above in which one of the hydrogen atoms of the alkyl is replaced by a heteroaryl group.

As used herein, the term "heteroaryl" may refer to a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are independently chosen from N, O, S, Si, or P.

As used herein, the term "alkylene group" may refer to a straight or branched saturated or unsaturated aliphatic hydrocarbon group having a valence of at least two, optionally substituted with one or more substituents where indicated, provided that the valence of the alkylene group is not exceeded.

As used herein, the term "arylene group" may refer to a functional group having a valence of at least two obtained by removal of two hydrogens in an aromatic ring, optionally substituted with one or more substituents where indicated, provided that the valence of the arylene group is not exceeded.

As used herein, the term "heteroarylene" may refer to a divalent radical formed by the removal of two hydrogen atoms from one or more rings of a heteroaryl moiety, as defined above, wherein the hydrogen atoms may be removed from the same or different rings (preferably the same ring), each of which rings may be aromatic or nonaromatic.

As used herein, the term "aliphatic organic group" may refer to a C1 to C30 linear or branched alkyl group, the term "aromatic organic group" may refer to a C6 to C30 aryl group or a C2 to C30 heteroaryl group, and the term "alicyclic organic group" may refer to a C3 to C30 cycloalkyl group, a C3 to C30 cycloalkenyl group, and a C3 to C30 cycloalkynyl group.

As used herein, the term "combination thereof" refers to a mixture, a stacked structure, a composite, an alloy, a blend, a reaction product, or the like.

As used herein, the term "(meth)acrylate" refers to acrylate and methacrylate.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. Unless specified otherwise, the term "or" means "and/or." As used herein, the term "and/or" includes any and all combinations of one or more of the associated listed items. Expressions such as "at least one of," when preceding a list of elements, modify the entire list of elements and do not modify the individual elements of the list.

According to an embodiment, a semiconductor nanocrystal composition includes
a semiconductor nanocrystal,
an organic additive, and
at least one polymerizable substance selected from a polymerizable monomer, a polymerizable oligomer, and a combination thereof,
wherein the composition has haze of greater than or equal to about 40% after being polymerized.

The haze is measured for a polymer film prepared from the composition and having a thickness of about 100 micrometers (μm) or lower, for example 50 μm or lower, or for example 25 μm or lower. The haze value may represent the ratio of the light deviated from the incident beam with respect to a total light being transmitted. After being polymerized, the semiconductor nanocrystal composition may show a haze value of less than or equal to about 95%. In some embodiments, a polymer film prepared from the composition and having a thickness of about 100 micrometers has a haze value of 45% to 95%, measured as described in the Examples below.

In the composition, (for example, unlike the capping agent), the organic additive may be present separately and independently from the semiconductor nanocrystal without surrounding or coordinating the surface thereof. In an embodiment, in a thermogravimetric analysis (TGA), the composition may show a peak of the organic additive at a temperature different from that of the capping agent (or a ligand compound) coordinating or surrounding the surface of the semiconductor nanocrystal.

The polymerizable substance may be a photo-polymerizable monomer and/or oligomer. In the semiconductor nanocrystal composition, the polymerizable substance may include the polymerizable monomer and the polymerizable oligomer.

The semiconductor nanocrystals may include a Group II-VI compound, a Group III-V compound, a Group IV-VI compound, a Group IV element or compound, or a combination thereof.

The Group II-VI compound may be selected from:
a binary element compound selected from CdSe, CdTe, ZnS, ZnSe, ZnTe, ZnO, HgS, HgSe, HgTe, MgSe, MgS, and a combination thereof;
a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and
a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound semiconductor may be selected from:
a binary element compound selected from GaN, GaP, GaAs, GaSb, AlN, AlP, AlAs, AlSb, InN, InP, InAs, InSb, and a combination thereof;
a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and
a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from:
a binary element compound selected from SnS, SnSe, SnTe, PbS, PbSe, PbTe, and a combination thereof;
a ternary element compound selected from SnSeS, SnSeTe, SnSTe, PbSeS, PbSeTe, PbSTe, SnPbS, SnPbSe, SnPbTe, and a combination thereof; and
a quaternary element compound selected from SnPbSSe, SnPbSeTe, SnPbSTe, and a combination thereof.

The Group IV element or compound may be selected from:
a singular element selected from Si, Ge, and a combination thereof; and
a binary element compound selected from SiC, SiGe, and a combination thereof.

The binary element compound, the ternary element compound, or the quaternary element compound may be present in a uniform concentration in a particle, or may be present in a locally different concentration in a single particle. The semiconductor nanocrystal may have a core-shell structure wherein a semiconductor nanocrystal surrounds another (different) semiconductor nanocrystal. The core and shell may have an interface, and an element in of at least one of the core or the shell in the interface may have a concentration gradient wherein the concentration of the element(s) of the shell decreases toward the core. The semiconductor nanocrystal may have one core of a semiconductor nanocrystal and multi-shells surrounding the core. The core and multi-shell structure has at least two shells wherein each shell may be a single composition, an alloy, or the one having a concentration gradient.

According to non-limiting examples, in the semiconductor nanocrystal particle, the materials of the shell may have a larger energy bandgap than that of the core, and thereby the semiconductor nanocrystal may exhibit a quantum confinement effect more effectively. In case of a multi-shell type of semiconductor nanocrystal particle, the bandgap of the material of an outer shell may be higher energy than that of the material of an inner shell (a shell that is closer to the core). In this case, the semiconductor nanocrystal may emit light of a wavelength ranging from UV to infrared light.

The semiconductor nanocrystal may have quantum efficiency of greater than or equal to about 50%, or greater than or equal to about 70%, or greater than or equal to about 90%. Within such ranges, it becomes possible to enhance the luminescence efficiency of the device.

The semiconductor nanocrystal may be designed to have a wider or narrower full width at half maximum (FWHM) in its photoluminescence spectrum depending on its application. By way of an example, for use in display devices, the semiconductor nanocrystal may have a narrower FWHM so as to realize enhanced color purity or color reproducibility. The semiconductor nanocrystal may have a FWHM of less than or equal to about 45 nanometers (nm), for example less than or equal to about 40 nm, or less than or equal to about 30 nm. Within such ranges, a device including the nanocrystal may have enhanced color purity or improved color reproducibility.

The semiconductor nanocrystal may have a particle diameter (the longest diameter in case of a non-spherical particle)

ranging from about 1 nm to about 100 nm, for example about 1 nm to about 20 nm, or for example about 1 nm to 10 nm.

The shape of the semiconductor nanocrystal is not particularly limited. By way of an example, the nanocrystal may have a spherical shape, a pyramidal shape, a multi-arm shape, a cubic shape, an elliptical shape, a tetrahedral shape, an octahedral shape, a cylindrical shape, a polygonal pillar-like shape, a conical shape, a columnar shape, a tubular shape, a helical shape, a funnel shape, a dendritic shape, or any of various common regular and irregular shapes. The nanocrystal may be in the form of a nanoparticle, a nanotube, a nanowire, a nano-fiber, a nano-plate, a nanosheet, or the like.

The semiconductor nanocrystal may be prepared in any method. For example, the semiconductor nanocrystal may be prepared by the method described hereinbelow, but it is not limited thereto.

In a non-limiting example, the semiconductor nanocrystal having a several nanometer size may be prepared via a wet chemical method. In the wet chemical method, precursors react in an organic solvent to grow nanocrystal particles, and the organic solvent or a ligand compound may coordinate the surface of the semiconductor nanocrystal, controlling the growth of the nanocrystal. As the organic materials on the surface of the semiconductor nanocrystal may adversely affect the stability of the device, extra organic materials—not coordinating the surface of the nanocrystal may be removed by adding the nanocrystal to an excess amount of a non-solvent and centrifuging the resulting mixture. Examples of the non-solvent may include, but are not limited to, acetone, ethanol, and methanol. After the removal of extra organic materials, the amount of the organic materials coordinated on the surface of the nanocrystal may be less than or equal to about 35% by weight, for example 25% by weight, based on the total weight of the nanocrystal. The organic materials may include a ligand compound, an organic solvent, or a combination thereof. The ligand compound may be any organic compound that may be used as a ligand compound in the wet chemical method, and the types thereof are not particularly limited. For example, the ligand compound may be $RCOOH$, $RNH_2$, $R_2NH$, $R_3N$, $RSH$, $R_3PO$, $R_3P$, $ROH$, $RCOOR'$, $RCONH_2$, $RCONHR'$, $RCONR'R''$, $RCN$, $RPO(OH)_2$, or $R_2POOH$, wherein R, R', and R" are each independently a C1 to C24 alkyl group, a C2 to C24 alkenyl group, or a C6 to C24 aryl group. The organic ligand compound may be coordinated to the surface of the nanocrystals as prepared, playing a role of well-dispersing the nanocrystals in a solution, and affecting the light-emitting and electrical characteristics of the nanocrystals. Examples of the organic ligand compound may include, but are not limited to: a thiol such as methanethiol, ethanethiol, propanethiol, butanethiol, pentanethiol, hexanethiol, octanethiol, dodecanethiol, hexadecanethiol, octadecanethiol, and benzylthiol; an amine such as methaneamine, ethaneamine, propaneamine, butaneamine, pentaneamine, hexaneamine, octaneamine, dodecaneamine, hexadecylamine, octadecylamine, dimethylamine, diethylamine, trioctylamine, and dipropylamine; an alcohol such as methanol, ethanol, propanol, and butanol; an acid such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, and benzoic acid; an ester thereof such as methyl acetate, ethyl acetate, methyl propionate, ethyl propionate; an amide thereof such as methyl acetamide, ethyl acetamide, methyl, propionamide, or ethyl propionamide; a nitrile thereof such as acetonitrile, propionitrile, butyronitrile; a phosphine such as methylphosphine, ethylphosphine, propylphosphine, butylphosphine, pentylphosphine, and the like, or an oxide compound thereof such as methylphosphine oxide, ethylphosphine oxide, propylphosphine oxide, butylphosphine oxide, and the like; a diphenylphosphine compound, a triphenylphosphine compound, and an oxide compound thereof; and a phosphonic acid. The organic ligand compound may be used alone or as a mixture of two or more compounds.

The solvent may be any one used in the wet chemical method, and the types thereof are not particularly limited. For example, the solvent may be selected from the group consisting of: a C6 to C22 primary amine such as hexadecylamine, a C6 to C22 secondary amine such as dioctylamine, and a C6 to C40 tertiary amine such as trioctylamine; a heterocyclic compound having a nitrogen atom such as pyridine; a C6 to C40 aliphatic hydrocarbon (e.g., alkane, alkene, alkyne, and the like) such as hexadecane, octadecane, octadecene, and squalane; a C6 to C40 aromatic hydrocarbon such as phenyl dodecane, phenyl tetradecane, phenyl hexadecane, and the like; a phosphine substituted with a C6 to C22 alkyl group such as trioctylphosphine; a phosphine oxide substituted with a C6 to C22 alkyl group such as trioctylphosphine oxide; a C12 to C22 aromatic ether such as phenyl ether, benzyl ether, and the like; and a combination thereof, but it is not limited thereto.

The organic additive may be an amine having at least one alkyl or alkenyl group of C8 or higher, and in an embodiment, an amine having at least one C8 to C30 alkyl group or at least one C8 to C30 alkenyl group (for example, a primary amine having an alkyl or alkenyl group of C8 or higher (e.g., C8 to C22) such as octyl amine, oleyl amine, hexadecyl amine, and the like, a secondary amine having an alkyl or alkenyl group of C8 or higher (e.g., C8 to C22) such as dioctyl amine, didecyl amine, and the like, and a tertiary amine having an alkyl or alkenyl group of C8 or higher (e.g., C8 to C22) such as trioctyl amine, tridodecyl amine, and the like), a phosphine having at least one alkyl or alkenyl group of C8 or higher, and in an embodiment, a phosphine having at least one C8 to C30 alkyl group or at least one C8 to C30 alkenyl group (for example, a primary phosphine having an alkyl of C8 or higher (e.g., C8 to C22), a secondary phosphine having an alkyl of C8 or higher (e.g., C8 to C22) such as dioctyl phosphine, a tertiary phosphine having an alkyl of C8 or higher (e.g., C8 to C22) such as trioctyl phosphine), a phosphine oxide having at least one alkyl or alkenyl group of C8 or higher, and in an embodiment, a phosphine oxide having at least one C8 to C30 alkyl group or at least one C8 to C30 alkenyl group (for example, a primary phosphine oxide having an alkyl of C8 or higher (e.g., C8 to C22), a secondary phosphine oxide having an alkyl of C8 or higher (e.g., C8 to C22) such as dioctyl phosphine oxide, a tertiary phosphine oxide having an alkyl of C8 or higher (e.g., C8 to C22) such as trioctyl phosphine oxide), or a combination thereof.

The organic additive may be included in an amount of about 0.05% by weight to about 10% by weight, for example, in an amount of about 0.1% by weight to about 6% by weight, for example, in an amount of about 0.1% by weight to about 5% by weight, based on the total weight of the polymerizable substance. The composition including the organic additive in an amount within the aforementioned range may produce a semiconductor-polymer composite having significantly increased haze and brightness while maintaining excellent mechanical and optical properties.

The polymerizable substance may include a mixture of a first monomer having at least two thiol (—SH) groups at its terminal ends and a second monomer having at least two carbon-carbon unsaturated bond-containing groups at its terminal ends, an acrylate monomer, an acrylate oligomer, a methacrylate monomer, a methacrylate oligomer, a urethane acrylate monomer, a urethane acrylate oligomer, an epoxy monomer, an epoxy oligomer, a silicone monomer, or a silicone oligomer.

The (meth)acrylate monomer may be selected from isobornyl (meth)acrylate, isooctyl (meth)acrylate, lauryl (meth)acrylate, benzyl (meth)acrylate, norbornyl (meth) acrylate, cyclohexyl (meth)acrylate, n-hexyl (meth)acrylate, iso-octyl (meth)acrylate, butyl (meth)acrylate, adamantyl acrylate, cyclopentyl acrylate, ethylene glycol dimethacrylate, hexanediol diacrylate, tricyclodecane dimethanol diacrylate, trimethylolpropane triacrylate, and a combination thereof.

The polymerizable oligomer is an oligomer that has at least one (e.g., at least two) polymerizable functional group such as a (meth)acrylate group, a vinyl group, and the like. The polymerizable oligomer may be selected from a urethane (meth)acrylate, an epoxy (meth)acrylate, a polyester (meth)acrylate, acrylic (meth)acrylate, polybutadiene (meth)acrylate, a silicone (meth)acrylate, melamine (meth) acrylate, and a combination thereof. The molecular weight of the polymerizable oligomer is not particularly limited and may be selected appropriately. For example, the molecular weight of the polymerizable oligomer may be about 1,000 to about 20,000 g/mol, for example about 1,000 to about 10,000 g/mol, but it is not limited thereto. The polymerizable oligomer may be synthesized in any known method or is commercially available.

The first monomer having at least two thiol (—SH) groups at its terminal ends may be represented by the following Chemical Formula 1.

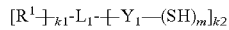   Chemical Formula 1

In Chemical Formula 1, $R^1$ is hydrogen, a substituted or unsubstituted linear or branched C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, a substituted or unsubstituted C2 to C30 alkynyl group, a substituted or unsubstituted C3 to C30 alicyclic organic group including a double bond or triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, —$NH_2$, a substituted or unsubstituted C1 to C60 amine group (—NRR', wherein R and R' are each independently a linear or branched C1 to C30 alkyl group), an isocyanurate group, a (meth)acrylate group, a halogen, —ROR' (wherein R is a substituted or unsubstituted C1 to C20 alkylene group and R' is hydrogen or a linear or branched C1 to C20 alkyl group), —C(=O)OR' (wherein R' is hydrogen or a linear or branched C1 to C20 alkyl group) —CN, or —C(=O)ONRR' (wherein R and R' are each independently hydrogen or a linear or branched C1 to C20 alkyl group);

$L_1$ is a single bond, a carbon atom, a substituted or unsubstituted C1 to C30 alkylene group, a substituted or unsubstituted C3 to C30 (e.g., C6-C30) cycloalkylene group, a substituted or unsubstituted C3 to C30 (e.g., C6-C30) cycloalkenylene group, a substituted or unsubstituted C6 to C30 arylene group, or a substituted or unsubstituted C3 to C30 heteroarylene group;

$Y_1$ is a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene group is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), —NR— (wherein R is hydrogen or a linear or branched C1 to C10 alkyl group), or a combination thereof;

m is an integer of 1 or more;

k1 is 0 or an integer of 1 or more;

k2 is an integer of 1 or more; and the sum of m and k2 is an integer of 3 or more, provided that m does not exceed the valence of $Y_1$, and provided that the sum of k1 and k2 does not exceed the valence of $L_1$.

The second monomer may be represented by the following Chemical Formula 2.

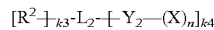   Chemical Formula 2

In Chemical Formula 2,

X is a C2 to C30 aliphatic organic group including a carbon-carbon unsaturated bond, a C6 to C30 aromatic organic group including a carbon-carbon double bond or a carbon-carbon triple bond, or a C3 to C30 alicyclic organic group including a carbon-carbon double bond or a carbon-carbon triple bond;

$R^2$ is hydrogen, a substituted or unsubstituted linear or branched C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, a substituted or unsubstituted C2 to C30 alkynyl group, a substituted or unsubstituted C3 to C30 alicyclic organic group including a double bond or triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, —$NH_2$, a substituted or unsubstituted C1 to C60 amine group (—NRR', wherein R and R' are each independently a linear or branched C1 to C30 alkyl group), an isocyanate group, an isocyanurate group, a (meth)acryloyloxy group, a halogen, —ROR' (wherein R is a substituted or unsubstituted C1 to C20 alkylene group and R' is hydrogen or a linear or branched C1 to C20 alkyl group), an acyl halide group (—RC(=O)X, wherein R is a substituted or unsubstituted alkylene group and X is a halogen), —C(=O)OR' (wherein R' is hydrogen or a linear or branched C1 to C20 alkyl group), —CN, or —C(=O)ONRR' (wherein R and R' are each independently hydrogen or a linear or branched C1 to C20 alkyl group);

$L_2$ is a single bond, a carbon atom, a substituted or unsubstituted C1 to C30 alkylene group, a substituted or unsubstituted C3 to C30 (e.g., C6-C30) cycloalkylene group, a substituted or unsubstituted C3 to C30 (e.g., C6-C30) cycloalkenylene group, a substituted or unsubstituted C6 to C30 arylene group, or a substituted or unsubstituted C3 to C30 heteroarylene group;

$Y_2$ is a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene group is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), —NR— (wherein R is hydrogen or a linear or branched C1 to C10 alkyl group), or a combination thereof;

n is an integer of 1 or more;

k3 is an integer of 0 or more;

k4 is an integer of 1 or more; and the sum of n and k4 is an integer of 3 or more, provided that n does not exceed the valence of $Y_2$, and provided that the sum of k3 and k4 does not exceed the valence of $L_2$.

The polymerizable monomer may have a hydrophilic moiety.

Examples of the first monomer of Chemical Formula 1 may include a monomer represented by Chemical formula 1-1.

Chemical Formula 1-1

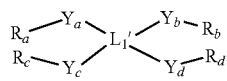

In Chemical Formula 1-1, $L_1'$ is a carbon atom, a substituted or unsubstituted C6 to C30 arylene group such as a substituted or unsubstituted phenylene group, a substituted or unsubstituted C3 to C30 heteroarylene group such as trioxotriazine, a substituted or unsubstituted C3 to C30 cycloalkylene group, or a substituted or unsubstituted C3 to C30 heterocycloalkylene group;

$Y_a$ to $Y_d$ are each independently a substituted or unsubstituted C1 to C30 alkylene group, a substituted or unsubstituted C2 to C30 alkenylene group, or a C1 to C30 alkylene group or a C2 to C30 alkenylene group, wherein at least one methylene group is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), or an imine group (—NR—) (wherein R is hydrogen or a linear or branched C1 to C10 alkyl group); and $R_a$ to $R_d$ are each independently a thiol group (SH) or $R_1$ of Chemical Formula 1, at least two of $R_a$ to $R_d$ are thiol groups (SH).

Specific examples of the first monomer represented by the above Chemical Formula 1 may include the compounds represented by the following Chemical Formulae 1-2 to 1-5.

Chemical Formula 1-2

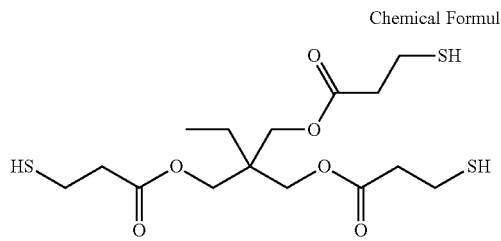

Chemical Formula 1-3

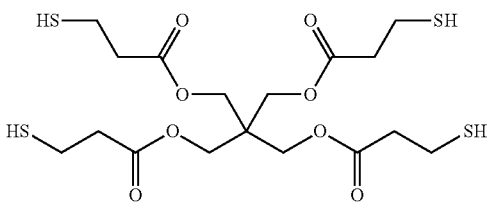

Chemical Formula 1-4

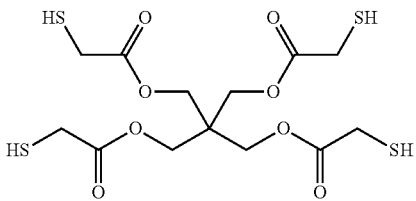

Chemical Formula 1-5

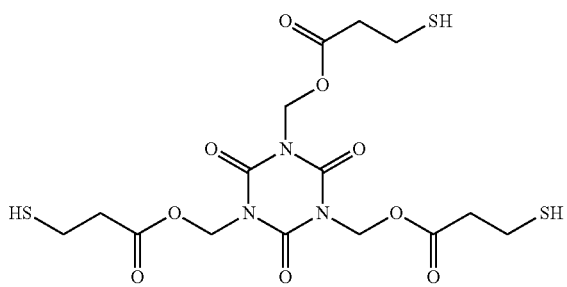

Regarding the second monomer, in the above Chemical Formula 2, X may be selected from a C2 to C30 aliphatic organic group including a carbon-carbon double bond or a carbon-carbon triple bond, a C6 to C30 aromatic organic group including a carbon-carbon double bond or a carbon-carbon triple bond, or a C3 to C30 alicyclic organic group including a carbon-carbon double bond or a carbon-carbon triple bond. X may be an acryloxy group, a methacryloxy group, a substituted or unsubstituted C2 to C30 alkenyl group, a substituted or unsubstituted C2 to C30 alkynyl group, a substituted or unsubstituted C3 to C30 alicyclic organic group including a double bond or triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, and a C3 to C30 heterocycloalkyl group substituted with a C2 to C30 alkenyl group or a C2 to C30 alkynyl group.

In the definitions of X of Chemical Formula 2, the alkenyl group may be a vinyl group, an allyl group, a 2-butenyl group, or a combination thereof. The C3 to C30 alicyclic organic group including a double bond or a triple bond may also be a norbornene group, a maleimide group, a nadimide group, a tetrahydrophthalimide group, or a combination thereof.

In Chemical Formula 2, $L_2$ may be a substituted or unsubstituted pyrrolidinyl group, a substituted or unsubstituted tetrahydrofuranyl group, a substituted or unsubstituted pyridyl group, a substituted or unsubstituted pyrimidyl group, a substituted or unsubstituted piperidyl group, a substituted or unsubstituted triazinyl group, a substituted or unsubstituted trioxotriazinyl group, a substituted or unsubstituted tricyclodecane moiety, or a substituted or unsubstituted isocyanurate group.

Examples of the second monomer of the above Chemical Formula 2 may include the compounds represented by the following Chemical Formulae 2-1 and 2-2.

Chemical Formula 2-1

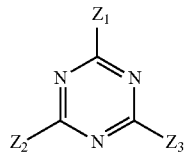

Chemical Formula 2-2

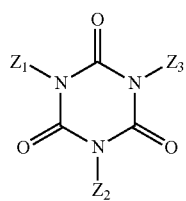

In Chemical Formulae 2-1 and 2-2, $Z_1$ to $Z_3$ are each independently *—$Y_2$—$X_n$ as defined for the above Chemical Formula 2, wherein * represents the point of attachment to $L_2$.

Examples of the second monomer of the above Chemical Formula 2 may include the compounds represented by the following Chemical Formulae 2-3 to 2-5.

Chemical Formula 2-3

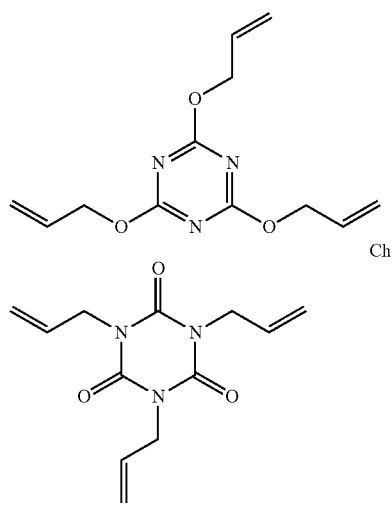

Chemical Formula 2-4

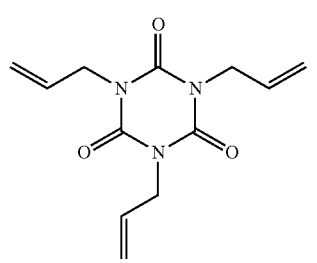

Chemical Formula 2-5

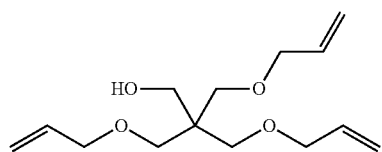

The first monomer and the second monomer may be used so that the thiol group of the first monomer and the unsaturated carbon-carbon bond of the second monomer may be present at a mole ratio of about 1:0.75 to about 1:1.25. When the above first and second monomers are used within the mole ratio range, a polymer having excellent mechanical strength and properties due to a high density network may be provided.

The polymer may be a polymerized product which is obtained by further polymerizing a third monomer having one thiol group located at a terminal end of the third monomer, a fourth monomer having one unsaturated carbon-carbon bond located at a terminal end of the fourth monomer, or a combination thereof.

The third monomer may be a compound in which each of m and k2 is 1 in Chemical Formula 1, and the fourth monomer may be a compound in which each of n and k4 is 1 in Chemical Formula 2.

The first monomer and the second monomer, and optionally the third monomer and/or the forth monomer, may undergo polymerization in the presence of an initiator so as to facilitate the crosslinking reaction between the thiol group and the carbon-carbon unsaturated bond. Examples of the initiator may include a phospine oxide, an α-amino ketone, phenylglyoxylate, monoacyl phosphine, benzyldimethylketal, and hydroxyketone.

The first monomer and the second monomer may be polymerized (e.g., cured) at an ambient temperature for a short period of time, and this makes it possible to avoid a high temperature process that may possibly deteriorate the stability of the luminance particle. In addition, the polymerized product has a densely crosslinked structure, which may effectively block the external material such as oxygen or moisture.

The semiconductor nanocrystal composition may further include one or more additional components such as a flame retardant, ultraviolet light stabilizer, heat stabilizer, antioxidant, diffusing agent, or a combination thereof. The type and amount of such additional component(s) will depend on the particular application. For example, each additional component may be present in an amount of 0.005 to 5% by weight, based on the total weight of the semiconductor nanocrystal composition.

In another embodiment, a semiconductor nanocrystal-polymer composite includes:
a semiconductor nanocrystal;
an organic additive; and
a polymerization product of a polymerizable monomer or a polymerization product of a mixture of a polymerizable monomer and a polymerizable oligomer,
wherein the composite having haze of greater than or equal to about 40%.

The semiconductor nanocrystal-polymer composite may be prepared by conducting the polymerization of the polymerizable monomer/oligomer (for example, via heat treatment or UV irradiation) from the aforementioned semiconductor nanocrystal composition. Therefore, details for the semiconductor nanocrystal, the organic additive, the polymerizable monomer, and the polymerizable oligomer are the same as set forth above. Conditions for the polymerization of the polymerizable monomer/oligomer are selected appropriately in light of the types of the polymerizable monomer/oligomer, and they are not particularly limited. When the polymerizable monomer/oligomer may undergo photo-polymerization, the polymerization may be initiated by the UV irradiation.

In the semiconductor nanocrystal composition or the semiconductor nanocrystal-polymer composite, the amount of the semiconductor nanocrystal is not particularly limited, and is selected appropriately. For example, the amount of the semiconductor nanocrystal may be greater than or equal to about 0.1% by weight based on the weight of the semiconductor nanocrystal composition or the semiconductor nanocrystal-polymer composite. For example, the amount of the semiconductor nanocrystal may be less than or equal to about 20% by weight based on the weight of the semiconductor nanocrystal composition or the semiconductor nanocrystal-polymer composite.

FIG. 1 schematically illustrates a non-limiting embodiment of a production process of the semiconductor nanocrystal polymer composite. Referring to FIG. 1, semiconductor nanocrystals (hereinafter also referred to as quantum dots or QDs) are synthesized in a colloidal state and extra organic materials are removed therefrom to prepare the semiconductor nanocrystals having an amount of the organic material of less than or equal to about 35 percent by weight (wt %) (i.e., bare QDs). The method of removing the extra amount of the organic material is the same as set forth above. The nanocrystals thus obtained are dispersed in a dispersing solvent, mixed with the organic additive and the polymerizable monomer, and then cured. Examples of the dispersing solvent may include, but are not limited to, chloroform, hexene, an acrylate monomer, and a combination thereof.

The method of mixing is not particularly critical and may be carried out by a variety of means, for example dispersion, blending, stirring, sonication, sparging, milling, shaking, centrifugal circulating pump mixing, blade mixing, impact mixing, jet mixing, homogenization, co-spraying, high sheer mixing, single pass and multi-pass mixing, and the like.

Using the semiconductor nanocrystal as a color down-converting material of LED enables obtaining a device that may exhibit better color purity than when using the conventional phosphors. Theoretical quantum yield of the quantum dots is 100% and its full width at half maximum can be less than about 45 nm, and thus the QDs have high color purity. Accordingly, when the QDs are applied in a light emitting device, they are expected to result in better color reproducibility than the conventional inorganic phosphors. However, the conventional inorganic phosphors have a size of micrometers, while the quantum dots have a nano-size so that they have relatively short reliability. Meanwhile, if the quantum dots are to be applied in a light emitting device, they may be required to have a life of 30,000 hrs or longer for the practical use of the device. In particular, when the colloidal quantum dots are applied to an LED, they are required to maintain their original quantum yield and color purity in order for the LED to exhibit good efficiency and high color reproducibility. For these purposes, it is important to preserve the passivation layer on the surface of the quantum dots. When the luminescent material is dispensed onto the LED chip, it may be provided as a powder and mixed with an encapsulation polymer, optionally with aid of a dispersing agent to improve the dispersion property. However, the colloidal QDs suffer from a problem of aggregation due to the poor compatibility between silicone (that has been widely used as an encapsulant) and the organic material on the surface of the QD, and during such process, loss of the organic material on the surface of the QD may occur easily, leading to a decrease in efficiency. Moreover, the amount of the organic material remaining on the surface of the QD largely depends on the synthesis conditions of the QDs and the purification degree thereof. Therefore, when the QDs are formed into a composite with a polymer, reproducibility is hard to achieve. In particular, when the organic material remaining on the surface of the QDs is excessively removed, the ligand compound is also removed from the surface of the QDs, and thereby degradation of the QDs and the passivation layer thereof may proceed very quickly when the device including the same is driven for a long time. In order to address such problems, it may be necessary to control the amount and the types of the organic material in the production of the QD and polymer composite. In addition, when the QD-polymer composite is used for down-converting light from a primary light source of the LED, the thickness of the composite and the amount of the QD may pose a limit on the penetration of light emitted from the primary light source and may adversely affect (e.g., decrease) the brightness due to the re-absorption between the QDs.

In the aforementioned embodiment, the semiconductor nanocrystal composition or the semiconductor nanocrystal-polymer composite prepared therefrom may resolve the foregoing problems of the prior arts and thereby achieve high brightness and enhanced level of stability at the same time. Without wishing to be bound by any theory, the organic additive added in the composition or the composite protects the surface of the QD, enhancing stability of the QD against air and moisture and preventing the photo-oxidation thereof. Moreover, the organic additive may increase the haze of the composite (in the sheet form or in the film form) without affecting the light transmittance and thus lengthen the optical path length of the primary light source. In addition, unlike the inorganic oxide particle, the organic additive may have substantially no effect on the polymerization reaction for the preparation of the composite and increases the haze and the brightness of the resulting composite without affecting the transmittance thereof. As a result, using such composite enables the realization of a display device having high brightness.

As stated above, in a non-limiting example, the semiconductor-polymer composite may be prepared by a process wherein the colloidal quantum dots as synthesized are subject to removal of extra organic material and then dispersed in an organic solvent or recovered in a powder form, and the resulting quantum dots are mixed with the organic additive and the monomer and (optionally after the removal of an organic solvent) then, for example, cured (e.g., by UV curing) to produce a thin film. Alternatively, the colloidal quantum dots as synthesized are subjected to a surface exchange process wherein the surface of the QD is exchanged with a polymer having a similar chemical structure to the ligand compound being used in the synthesis process, and then the stable QD-polymer composite is formed in the same manners as set forth above.

Figure 2:
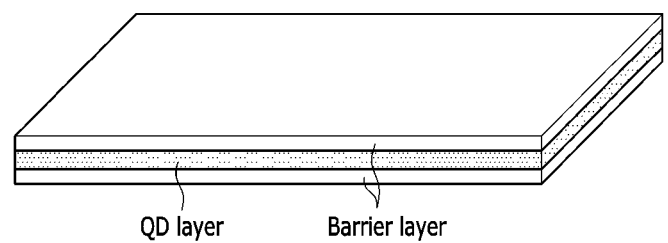
FIG. 2 is a view illustrating a sheet including a semiconductor nanocrystal-polymer composite in accordance with an embodiment.

In non-limiting examples, as shown in FIG. 2, various protective films (e.g., a barrier layer) such as a silica, titania, or alumina film for blocking oxygen or moisture may be disposed (e.g., coated or laminated) on the semiconductor nanocrystal-polymer composite so as to enhance the stability of the composite.

In another embodiment, a backlight unit for a liquid crystal display includes:

an LED light source; and a light conversion layer disposed separately from the LED light source to convert light emitted from the LED light source to white light and to provide the white light to a liquid crystal panel, wherein the light conversion layer includes the aforementioned semiconductor nanocrystal-polymer composite.

The backlight unit may further include a light guide panel disposed between the LED light source and the light conversion layer.

Details of the semiconductor nanocrystal-polymer composite are the same as set forth above. Hereinbelow, a backlight unit according to an embodiment and a liquid crystal display device including the same are explained with reference to the drawings.

Figure 8:
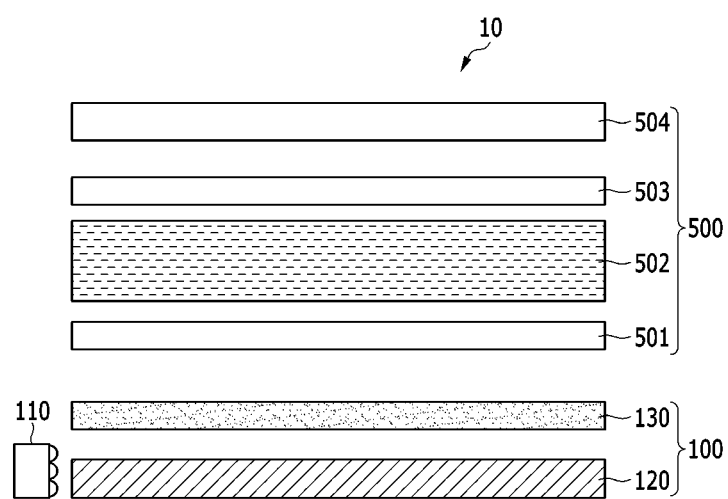
FIG. 8 is a view illustrating a liquid crystal display device including a backlight unit according to an embodiment.

FIG. 8 is a schematic view of a liquid crystal display device 10 including a backlight unit in accordance with an embodiment.

Referring to FIG. 8, the liquid crystal display device 10 includes a backlight unit 100 and a liquid crystal panel 500 to provide a predetermined colored image using white light provided from the backlight unit 100.

The backlight unit 100 includes a light emitting diode ("LED") light source 110, a light conversion layer 130 to convert light emitted from the LED light source 110 to white light, and a light guide panel 120 disposed therebetween to guide the light emitted from the LED light source 110 to the light conversion layer 130. The LED light source 110 includes a plurality of LED chips emitting light having predetermined wavelengths. The LED light source 110 may be a blue light-emitting LED light source or an ultraviolet (UV)-emitting LED light source, for example.

A reflector (not shown) may be further disposed on the lower surface of the light guide panel 120.

The light conversion layer 130 is spaced apart from the LED light source 110 by a predetermined distance and converts light emitted from the LED light source 110 to white light, which is then transmitted to the liquid crystal panel 500.

Herein, the light conversion layer 130 includes the aforementioned semiconductor-polymer composite. Details of the semiconductor-polymer composite are the same as set forth above.

The backlight unit 100 may further include a diffusion plate on a light guide panel 120, and the light conversion layer 130 may be disposed between the light guide panel and diffusion plate, or on a side of the diffusion plate opposite the light guide panel. Materials and structures for each of the LED light source 110, the light guide panel, the diffusion plate, and the liquid crystal panel are known in the art and are commercially available, and thus are not particularly limited.

The foregoing semiconductor nanocrystal-polymer composite included in the light conversion layer 130 may be fabricated in the form of a film. The film can be fabricated by using a mold or by casting to have various thicknesses and forms.

When the light emitted from the LED light source 110 is passed through the light conversion layer 130 including the semiconductor nanocrystal, blue light, green light, and red light are mixed to emit white light. By changing the compositions and sizes of semiconductor nanocrystals in the light conversion layer 130, the blue light, green light, and red light may be controlled to a desirable ratio, so as to provide white light which provides excellent color reproducibility and color purity. The white light may have color coordinates where Cx is about 0.24 to about 0.56 and Cy is about 0.24 to about 0.42 in a CIE 1931 chromaticity diagram.

In an embodiment, the light conversion layer 130 may include a plurality of layers. In an embodiment, the plurality of layers may be disposed so that the light emitting wavelength becomes longer in a direction towards the LED light source 110. For example, if the LED light source 110 is a blue LED light source, the light conversion layer 130 may include a red light conversion layer and a green light conversion layer that are sequentially stacked in a direction away from the LED light source 110.

Even though not shown in FIG. 8, on the light conversion layer 130, a film, e.g., a diffusion plate, a prism sheet, a microlens sheet, a brightness enhancement film (e.g., double brightness enhancement film ("DBEF")), or a combination thereof, may be further disposed. In addition, the light conversion layer 130 may be disposed between at least two films, e.g., a light guide panel, a diffusion plate, a prism sheet, a micro-lens sheet, a brightness enhancement film (e.g., double brightness enhancement film ("DBEF")), or a combination thereof.

Figure 9:
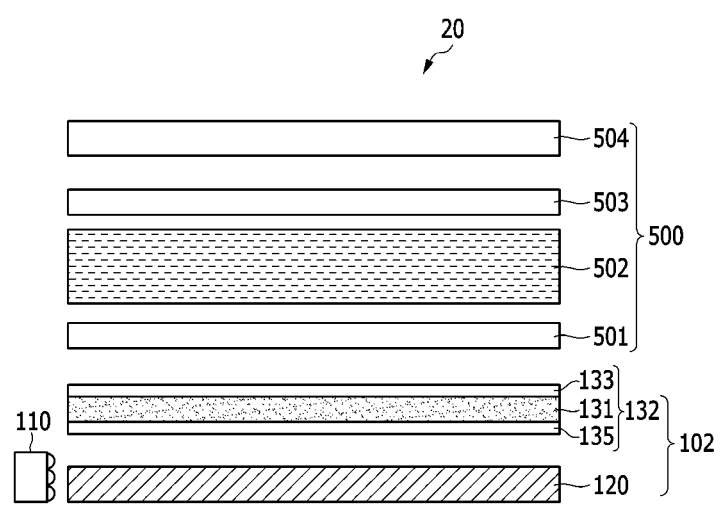
FIG. 9 is a view illustrating a liquid crystal display device including a backlight unit according to another embodiment.

FIG. 9 is a schematic view of a liquid crystal display device 20 including the backlight unit 102 according to another embodiment.

As shown in FIG. 9, a light conversion layer 132 may include a film 131 including the polymer matrix and the semiconductor nanocrystal, and at least one of a first polymer film 133 and a second polymer film 135 may be disposed on at least one surface of the film 131. The second polymer film 135 disposed under the film 131 may act as a barrier for preventing degradation of the semiconductor nanocrystal caused by the LED light source 110.

The first polymer film 133 and the second polymer film 135 may include a polyester, a cyclic olefin polymer ("COP"), a second polymer product produced by polymerization of the first monomer including at least two thiol (—SH) groups, each located at a terminal end of the first monomer, and the second monomer including at least two unsaturated carbon-carbon bonds at a terminal end of the second monomer, or a combination thereof. The polyester may include polyethylene terephthalate, polybutylene terephthalate, polyethylene naphthalate, or the like, or a combination thereof. The cyclic olefin polymer may be a polymer produced by chain copolymerization of a cyclic monomer, such as a norbornene or a tetracyclododecene, with a linear olefin monomer such as ethylene. In an embodiment, the polymerized product of the first monomer including at least two thiol (—SH) groups, each located at a terminal end of the first monomer, and the second monomer including at least two unsaturated carbon-carbon bonds at a terminal end of the second monomer may be the same as set forth above.

At least one of the first polymer film 133 and the second polymer film 135 may further include an inorganic oxide. The inorganic oxide may include silica, alumina, titania, zirconia, or a combination thereof. The inorganic oxide may act as a light diffusion material. The inorganic oxide may be coated with a thickness of about 10 nm to about 100 nm on a surface of at least one of the first polymer film 133 and the second polymer film 135.

The first polymer film 133 may have an uneven pattern having a predetermined size on the surface opposite, e.g., not contacting, the film 131 including a polymer matrix and semiconductor nanocrystal. The second polymer film 135 may also have an uneven pattern having a predetermined size on the surface opposite, e.g., not contacting, the film 131 including a polymer matrix and semiconductor nanocrystal. The first polymer film 133 and the second polymer film 135, with the uneven pattern thereon, may suitably diffuse light emitted from the LED light source 110. Accordingly, the liquid crystal display device may omit a diffusion plate or a prism sheet that may be present on the light guide panel 120 in other embodiments. However, according to another embodiment, the diffusion plate or a prism sheet may be disposed on the light guide panel 120.

Even though not shown in FIG. 9, a film, e.g., a diffusion plate, a prism sheet, a microlens sheet, and a brightness enhancement film (e.g., double brightness enhancement film ("DBEF")), or a combination thereof, may be further disposed on the light conversion layer 132. In addition, the light conversion layer 132 may be disposed between at least two films, e.g., a light guide panel, a diffusion plate, a prism sheet, a micro-lens sheet, a brightness enhancement film (e.g., double brightness enhancement film ("DBEF")), or a combination thereof.

The white light emitted from the backlight unit, e.g., backlight units 100 and 102 is incident toward the liquid crystal panel 500. The liquid crystal panel 500 provides a predetermined color image using the white light incident from the backlight units 100 and 102. The liquid crystal panel 500 may have a structure in which a first polarizer 501, a liquid crystal layer 502, a second polarizer 503, and a color filter 504 are sequentially disposed. The white light emitted from the backlight unit, e.g., backlight units 100 and 102, is transmitted through the first polarizer 501, the liquid crystal layer 502, and the second polarizer 503 and then into the color filter 504 to express a predetermined color image.

In another embodiment, a liquid crystal display device includes:

an LED light source;

a light conversion layer disposed separately from the LED light source to convert light emitted from the LED light source to white light and to provide the white light to the liquid crystal panel; and a liquid crystal panel for providing an image using light provided from the light conversion layer, wherein the light conversion layer includes the aforementioned semiconductor nanocrystal-polymer composite.

The liquid crystal display may further include a light guide panel disposed between the LED light source and the light conversion layer.

The liquid crystal panel is not particularly limited, and any liquid crystal panel that is known in the art or is commercially available may be included. Details for the liquid crystal display device are the same as set forth above.

Hereinafter, the present invention is illustrated in more detail with reference to specific examples. However, they are exemplary embodiments of the present invention, and the present invention is not limited thereto.

EXAMPLES

Reference Example 1: Production of Bare Semiconductor Nanocrystals (1) 0.2 mmol of indium acetate, 0.6 mmol of palmitic acid, and 10 mL of 1-octadecene are placed in a flask, subjected to a vacuum state at 120° C. for one hour, and then heated to 280° C. after the atmosphere in the flask is exchanged with $N_2$. Then, a mixed solution of 0.1 mmol of tris(trimethylsilyl)phosphine ($TMS_3P$) and 0.5 mL of trioctylphosphine (TOP) is quickly injected and the reaction proceeds for 20 minutes. The reaction mixture then is rapidly cooled and acetone is added thereto to produce nanocrystals, which are then separated by centrifugation and dispersed in toluene. The first absorption maximum in UV-VIS spectrum of the InP core nanocrystals thus prepared is in the range of 420~600 nm.

0.3 mmol (0.056 g) of zinc acetate, 0.6 mmol (0.189 g) of oleic acid, and 10 mL of trioctylamine are placed in a flask, subjected to a vacuum state at 120° C. for 10 minutes, and then heated to 220° C. after the atmosphere in the flask is exchanged with $N_2$. Then, a toluene dispersion of the InP core nanocrystals thus prepared (optical density: 0.15) and 0.6 mmol S/TOP are added to the flask and then the resulting mixture is heated to 280° C., and the reaction proceeds for 30 minutes. After the reaction, the reaction solution is quickly cooled to room temperature to obtain a reaction mixture including InP/ZnS semiconductor nanocrystals.

(2) An excess amount of ethanol is added to the reaction mixture including the InP/ZnS semiconductor nanocrystals, which is then centrifuged to remove an extra organic material on the reaction mixture of the semiconductor nanocrystals. After centrifugation, the supernatant is discarded and the precipitate is dispersed in hexane again, and an excess amount of ethanol is added thereto and the resulting mixture is centrifuged again. The precipitate obtained from the 2nd centrifugation is dried and dispersed in chloroform. A UV-vis absorption spectrum of the resulting dispersion is measured.

Figure 12:
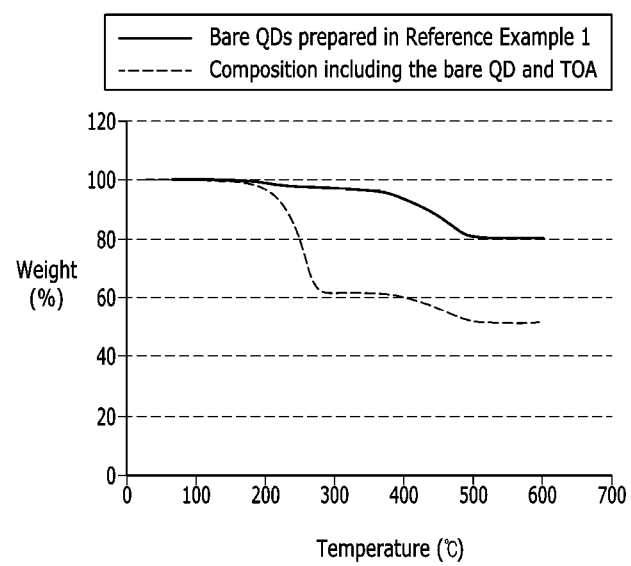
FIG. 12 and FIG. 13 are graphs of weight loss (percent, %) versus temperature (degree Centigrade, ° C.) and derivative of weight loss (percent, %) versus temperature (degree Centigrade, ° C.), which shows the results of the thermogravimetric analysis for the bare semiconductor nanocrystals prepared in Reference Example 1 and a composition prepared by adding trioctylamine to the bare semiconductor nanocrystals.
Figure 13:
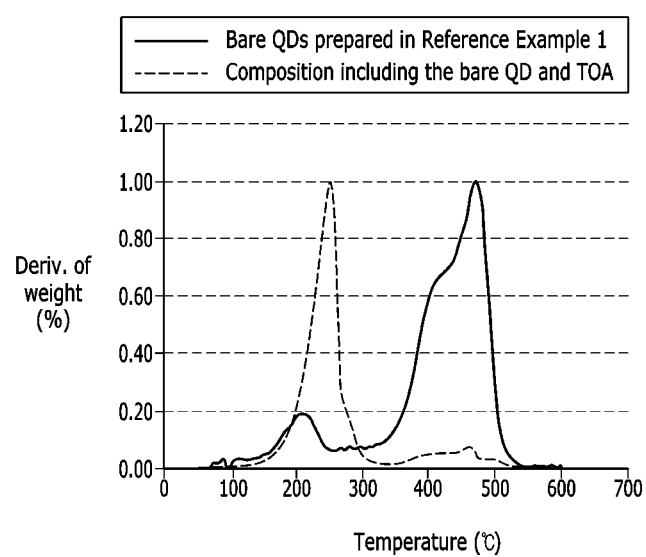

(3) The precipitate obtained from each centrifugation is subjected to thermogravimetric analysis (TGA) under a $N_2$ atmosphere while heating the sample to 600° C. at a rate of 10° C./min. The results of TGA for the precipitate after the second centrifugation are shown in FIG. 12 and FIG. 13. The precipitate after the first centrifugation is found to have organic material in an amount of about 60 wt % based on the total weight of the precipitate. From the results of FIG. 12 and FIG. 13, the precipitate after the second centrifugation is found to have organic material in an amount of about 20 wt % based on the total weight of the precipitate.

(4) To the precipitate obtained after the 2nd centrifugation is added 30 grams of trioctylamine to prepare a composition. The prepared composition is subjected to a thermogravimetric analysis under a $N_2$ atmosphere while heating the sample to 600° C. at a rate of 10° C./min. The results are shown in FIG. 12 and FIG. 13.

The results of FIG. 12 and FIG. 13 confirm that the trioctylamine separately added to the precipitate may be decomposed at a temperature different from the temperature at which the organic substance remaining on the precipitate (e.g., the ligand compound or the solvent coordinating the bare QD) is decomposed.

Comparative Preparation Examples 1 to 3 and Preparation Examples 1 and 2: Preparation of Semiconductor Nanocrystal Composition 0.89 g of pentaerythritol tetrakis(3-mercaptopropionate) (4T), 0.61 g of 1,3,5-triallyl-1,3,5-triazine-2,4,6-trione (TTT), and 0.03 g of Irgacure 754 are mixed to prepare a monomer mixture. The monomer mixture is degassed under vacuum.

An organic additive in an amount as set forth in Table 1 is added to the chloroform dispersion prepared in Reference Example 1 [concentration: (absorption at 449 nm)×(volume of QD solution (mL))=3.75], and then vortexed to prepare mixed solutions for Comparative Preparation Examples 2 and 3 and Preparation Examples 1 and 2, respectively. For Comparative Preparation Example 1, the semiconductor nanocrystal dispersion is mixed with the monomer mixture and then vortexed to obtain a semiconductor nanocrystal composition. For Comparative Preparation Examples 2 and 3 and Preparation Examples 1 and 2, each of the aforementioned mixed solutions is mixed with the monomer mixture and vortexed to obtain a semiconductor nanocrystal composition as set forth in Table 1. The resulting composition is dried under vacuum at an ambient temperature to eliminate chloroform contained in the composition.

TABLE 1

| Sample | Type of organic additive | Amount of organic additive based on a total weight of the monomer mixture |
|---|---|---|
| Comp. Preparation Example 1 | — | — |
| Comp. Preparation Example 2 | ODE (octadecene) | 0.5 wt % |

TABLE 1-continued

| Sample | Type of organic additive | Amount of organic additive based on a total weight of the monomer mixture |
|---|---|---|
| Comp. Preparation Example 3 | TEA (triethylamine) | 2.5 wt % |
| Preparation Example 1 | TOA (trioctyl amine) | 0.1 wt % |
| Preparation Example 2 | TOP (trioctyl phosphine) | 2.5 wt % |

Examples 1 and 2 and Comparative Examples 1 to 3

Each of the semiconductor nanocrystal compositions of Comparative Preparation Examples 1 to 3 and Preparation Examples 1 and 2 is drop casted on a PET film having a sputtered barrier. The barrier material is $SiO_x$ (0<x<2, I-component Co., Ltd.). The composition is covered with a PET film and is UV-cured with a light intensity of 100 milliwatts per square centimeter (mW/cm$^2$) for four minutes to produce a semiconductor-polymer composite film having a structure as shown in FIG. 2.

The haze of the semiconductor-polymer composite film thus prepared is measured using a spectrophotometer (Konica Minolta, CM-3600d) in accordance with the following manner.

First, light is irradiated into an integrating sphere, the light intensity T1 is measured when all of light is collected, and the light intensity T2 is measured when a black plate is placed in a direction perpendicular to the incident light to exclude light penetrating in a straight line. Then, the semiconductor nanocrystal-polymer composite film is placed in the entrance of the integrating sphere to measure the light intensity T3 when all of light is collected and the light intensity T4 when a black plate is placed in a direction perpendicular to the incident light to exclude light penetrating in a straight line. The haze is calculated by the following equation.

$(T4/T3-T2/T1) \times 100 (\%)$

The semiconductor nanocrystal-polymer composite film is inserted between the light guide panel and optical films (i.e., a prism sheet, a micro-lens sheet, a brightness enhancement film) of a 60 inch TV equipped with a blue LED having a peak wavelength of 449 nm. Then, the brightness of the semiconductor nanocrystal-polymer composite film is measured using a spectro-radiometer (Konica Minolta, CS-2000) placed 30 centimeters ahead of the TV when the TV is turned on. The brightness is a relative value with respect to a reference film, i.e., a semiconductor nanocrystal-polymer composite film.

Figure 3:
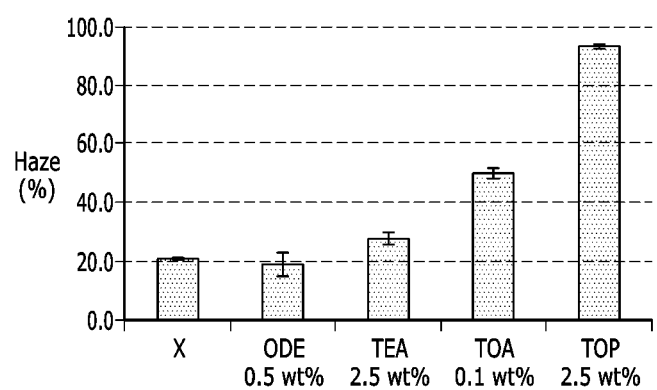
FIG. 3 is a diagram comparing haze values (percent, %) of semiconductor nanocrystal-polymer composites, each being prepared by adding different organic additives in different amounts.
Figure 4:
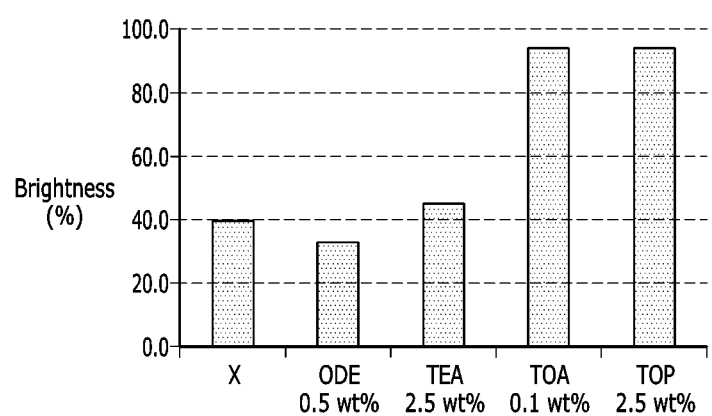
FIG. 4 is a diagram comparing the brightness of backlight units (percent, %) each including one of the semiconductor nanocrystal-polymer composites that are prepared by adding different organic additives in different amounts.

The results of the haze and the relative brightness thus measured are compiled in Table 2 and FIG. 3 and FIG. 4.

TABLE 2

| Samples | Haze (%) | Relative brightness of the film (%) |
|---|---|---|
| Comp. Example 1 | 21.0 | 40 |
| Comp. Example 2 | 19.2 | 33 |
| Comp. Example 3 | 28.4 | 45 |
| Example 1 | 50.2 | 94 |
| Example 2 | 93.3 | 94 |

The films of Examples 1 and 2 have a greatly increased (for example by 200%, or as high as 400%) value of the haze due to the increase in light scattering. In addition, the brightness of films of Examples 1 and 2 significantly increase, for example by 200% or higher.

Preparation Examples 3 to 6: Preparation of Semiconductor Nanocrystal Composition II A semiconductor nanocrystal composition is prepared in the same manner set forth in Preparation Example 1, except using 0.37 wt % of oleyl amine (Preparation Example 3), 0.18 wt % of octyl amine (Preparation Example 4), 0.34 wt % of dioctyl amine (Preparation Example 5), and 2.5 wt % of trioctyl phosphine oxide (Preparation Example 6).

Examples 3 to 6

A semiconductor nanocrystal-polymer composite is prepared in the same manner set forth in Example 1, except using the semiconductor nanocrystal compositions of Preparation Examples 3 to 6. The brightness of each film is measured and the results are shown in FIG. 5 and Table 3.

TABLE 3

| | Organic additive (amount) | haze (%) | brightness (%) |
|---|---|---|---|
| Example 3 | Oleyl amine (0.37 wt %) | 64.7 | 76 |
| Example 4 | Octyl amine (0.18 wt %) | 74.9 | 79 |
| Example 5 | Dioctyl amine (0.34 wt %) | — | 84 |
| Example 6 | Trioctylphosphine oxide (2.5 wt %) | 87.8 | 84 |

Figure 5:
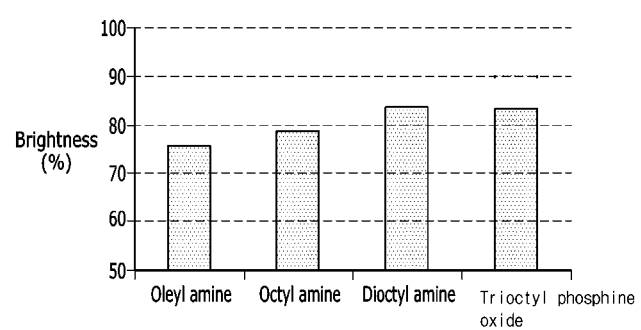
FIG. 5 is a diagram comparing the brightness of backlight units (percent, %) each including one of the semiconductor nanocrystal-polymer composites that are prepared by adding different organic additives in different amounts.

The results of FIG. 5 and Table 3 confirm that the addition of the organic additive makes it possible to increase the brightness of the semiconductor nanocrystal-polymer composite film by about at least 2 times.

Example 7: Changes in the Brightness Over Various Amounts of the Organic Additive A semiconductor nanocrystal-polymer composite is prepared in the same manner set forth in Example 1, except using one of the semiconductor nanocrystal compositions, each including trioctyl amine or trioctyl phosphine in an amount as set forth in Table 4, respectively. The haze and the brightness of each film are measured and the results are shown in FIG. 6 and Table 4.

TABLE 4

| | Organic additive (amount) | haze (%) | brightness (%) |
|---|---|---|---|
| Example 7 | TOA 0.5 wt % | 50.9 | 88 |
| | TOA 2.5 wt % | 94.5 | 91 |
| | TOA 5 wt % | 95.5 | 91 |
| | TOP 1 wt % | 90.6 | 69 |
| | TOP 5 wt % | 95.0 | 88 |

Figure 6:
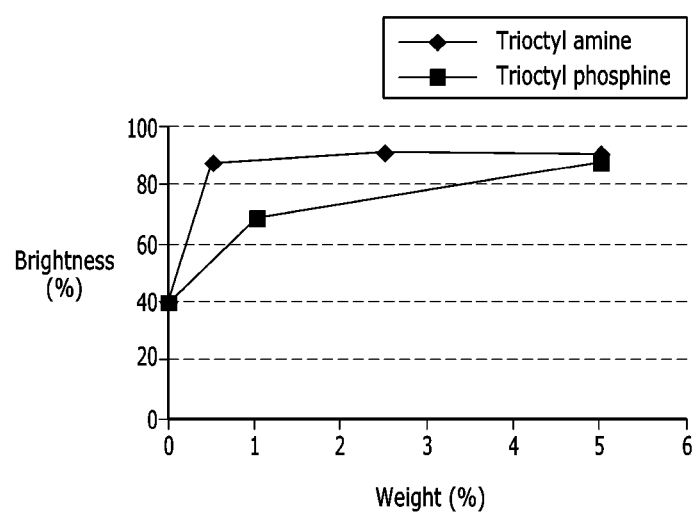
FIG. 6 is a graph of brightness (percent, %) versus percent by weight (weight %) showing changes in the brightness of a backlight unit including a semiconductor nanocrystal-polymer composite with respect to the amount of the organic additive.

The results of FIG. 6 and Table 4 confirm that the addition of the organic additive makes it possible to increase the haze and the brightness of the semiconductor nanocrystal-polymer composite film.

Example 8: Evaluation of Reliability

Semiconductor nanocrystal-polymer composites are prepared using the semiconductor nanocrystals having undergone removal of extra organic materials once or twice and using 0.5 wt % of trioctyl amine, 5 wt % of trioctyl phosphine, or 10 wt % of trioctyl phosphine. For each of the semiconductor nanocrystal-polymer composite films, reliability is tested according to the following manners when a backlight unit is operated.

The semiconductor nanocrystal-polymer composite film is inserted between the light guide panel and optical films (i.e., a prism sheet, a micro-lens sheet, a brightness enhancement film) and the protective film of a 40 inch TV equipped with a blue LED having a peak wavelength of 449 nm. Then, the brightness of the semiconductor nanocrystal-polymer composite film is measured using a spectro-radiometer (Konica Minolta, CS-2000) placed 30 centimeters ahead of the TV when the TV is turned on. As the TV is operated in a high temperature chamber at 50° C., the brightness of the film is measured over time to compare changes in the brightness.

Figure 7:
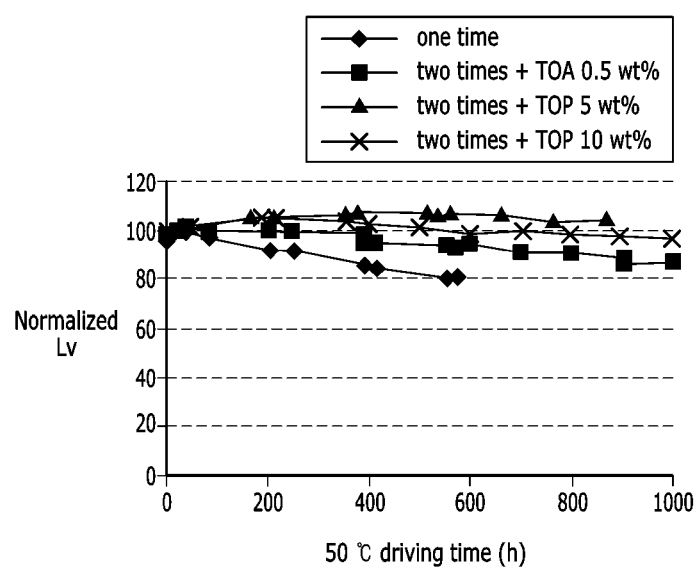
FIG. 7 shows results of evaluating the reliability of driving the backlight unit including one of semiconductor nanocrystal-polymer composites that are prepared by adding different organic additives in different amounts.

Results are shown in FIG. 7. FIG. 7 confirms that the semiconductor nanocrystal-polymer composite films of the examples have excellent stability together with high brightness.

Comparative Preparation Examples 4 and 5 and Preparation Example 7: Preparation of Semiconductor Nanocrystal Composition 30 parts by weight of lauryl methacrylate (as a monomer), 36 parts by weight of tricyclodecane dimethanol diacrylate (as a monomer), 4 parts by weight of trimethylol propane triacrylate (as a monomer), and 20 parts by weight of epoxy diacrylate oligomer (from Sartomer, as an oligomer) are mixed to prepare a monomer/oligomer mixture, to which 1 parts by weight of 1-hydroxy-cyclohexyl-phenyl-ketone and 1 parts by weight of 2,4,6-trimethylbenzoyl-diphenyl-phosphine oxide are further added. The resulting mixture is defoamed under vacuum.

Semiconductor nanocrystals are centrifuged once in the same manner as set forth in Reference Example 1. The resulting toluene dispersion of the semiconductor nanocrystals [concentration: (absorption at 449 nm)×(volume of QD solution (mL))=3.75] is mixed with an excess amount of ethanol and then centrifuged. The semiconductor nanocrystals thus separated are dispersed in 10 parts by weight of lauryl methacrylate (as a monomer) and an organic or inorganic additive is added thereto in an amount as set forth in Table 5, and then vortexed to prepare mixed solutions for Comparative Preparation Example 5 and Preparation Example 7, respectively.

For Comparative Preparation Example 4, the semiconductor nanocrystal chloroform dispersion obtained in the same manner as Reference Example 1(2) (i.e., after the second centrifugation) is mixed with the resulting mixture and then vortexed to obtain a semiconductor nanocrystal composition.

For Comparative Preparation Example 5 and Preparation Example 7, each of the aforementioned mixed solutions is mixed with the resulting mixture including the monomer/oligomer mixture (90 parts by weight) and vortexed to obtain a semiconductor nanocrystal composition as set forth in Table 5.

TABLE 5

| Samples | Type of additive | Amount of organic additive (per a total 100 parts by weight of the monomers and the oligomer) |
|---|---|---|
| Comp. Preparation Example 4 | none | — |
| Comp. Preparation Example 5 | Silica (from Sigma Aldrich, product #748161) | 5 parts by weight |
| Preparation Example 7 | TOP (trioctyl phosphine) | 5 parts by weight |

Example 9 and Comparative Examples 4 and 5

A semiconductor nanocrystal-polymer composite is prepared in the same manner set forth in Example 1, except using the semiconductor nanocrystal compositions of Preparation Example 7 (for Example 9) and Comparative Preparation Examples 4 and 5 (for Comparative Examples 4 and 5). The brightness and the haze of each film are measured and the results are shown in FIG. 10 and FIG. 11, respectively.

Figure 10:
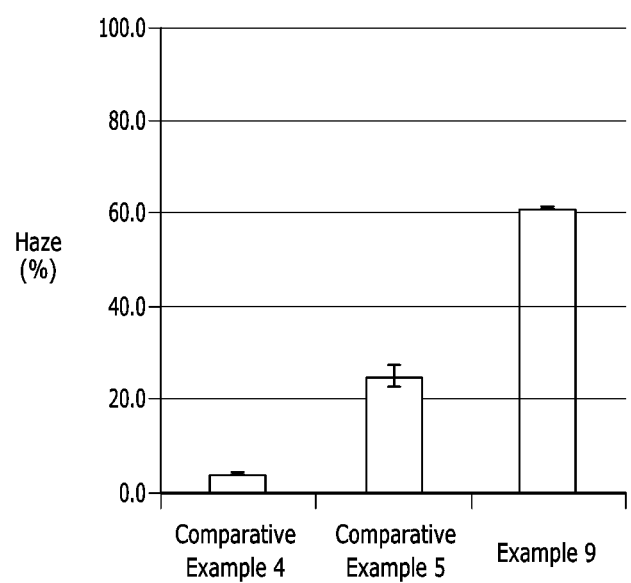
FIG. 10 is a diagram comparing the haze values (percent, %) of the semiconductor nanocrystal-polymer composites of Comparative Example 4, Comparative Example 5, and Example 9.
Figure 11:
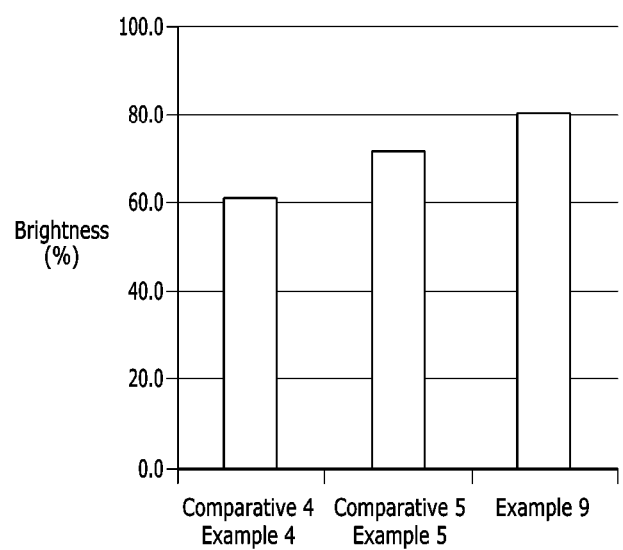
FIG. 11 is a graph comparing the brightness values (percent, %) of the semiconductor nanocrystal-polymer composites of Comparative Example 4, Comparative Example 5, and Example 9.

FIG. 10 and FIG. 11 confirm that the film of Example 9 including TOP as an additive has far higher haze (61.4%) and significantly more enhanced brightness (81%) than those of Comparative Examples 4 and 5, each including no additive or silica (that has a larger difference of refractive index (RI) from the epoxy resin).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A semiconductor nanocrystal composition comprising:
a semiconductor nanocrystal,
an organic additive, and
at least one polymerizable substance selected from a polymerizable monomer, a polymerizable oligomer, and a combination thereof,
wherein the organic additive comprises a primary amine having one C8 to C30 alkyl or alkenyl group, a secondary amine having two C8 to C30 alkyl or alkenyl groups, a tertiary amine having three C8 to C30 alkyl or alkenyl groups, a primary phosphine having one C8 to C30 alkyl or alkenyl group, a secondary phosphine having two C8 to C30 alkyl or alkenyl groups, a tertiary phosphine having three C8 to C30 alkyl or alkenyl groups, a primary phosphine oxide having one C8 to C30 alkyl or alkenyl group, a secondary phosphine oxide having two C8 to C30 alkyl or alkenyl groups, a tertiary phosphine oxide having three C8 to C30 alkyl or alkenyl groups, and
wherein the composition has a haze of greater than or equal to 40% after polymerization.
2. The semiconductor nanocrystal composition of claim 1, wherein the polymerizable substance comprises a polymerizable monomer and a polymerizable oligomer.
3. The semiconductor nanocrystal composition of claim 1, wherein the semiconductor nanocrystal comprises a Group

II-VI compound, a Group III-V compound, a Group IV-VI compound, a Group IV element or compound, or a combination thereof.

4. The semiconductor nanocrystal composition of claim 1, wherein the semiconductor nanocrystal has a core-shell structure.

5. The semiconductor nanocrystal composition of claim 1, wherein the semiconductor nanocrystal has a photoluminescence quantum yield of greater than or equal to 50%.

6. The semiconductor nanocrystal composition of claim 1, wherein the semiconductor nanocrystal has a full width at half maximum of less than or equal to 45 nanometers.

7. The semiconductor nanocrystal composition of claim 1, wherein the semiconductor nanocrystal comprises a surface organic compound,
wherein an amount of the organic compound is less than or equal to 35% by weight based on the total weight of the semiconductor nanocrystal, and
wherein the surface organic compound comprises a ligand compound, a solvent, or a combination thereof.

8. The semiconductor nanocrystal composition of claim 1, wherein the composition has a haze of 45% to 95% after polymerization.

9. The semiconductor nanocrystal composition of claim 1, wherein an amount of the organic additive is 0.05% by weight to 10% by weight based on the total weight of the polymerizable substance.

10. The semiconductor nanocrystal composition of claim 1,
wherein the polymerizable monomer comprises a combination of a first monomer comprising at least two thiol groups, each located at its terminal ends and a second monomer comprising at least two carbon-carbon unsaturated bonds each located at its terminal ends, an acrylate monomer, a methacrylate monomer, a urethane (meth)acrylate monomer, an epoxy monomer, a silicone monomer, or a combination thereof, and
wherein the polymerizable oligomer comprises an acrylate oligomer, a methacrylate oligomer, a urethane acrylate oligomer, an epoxy oligomer, a silicone oligomer, or a combination thereof.

11. The semiconductor nanocrystal composition of claim 1, wherein the semiconductor nanocrystal composition further comprises an inorganic oxide selected from silica, alumina, titania, zirconia, zinc oxide, and a combination thereof.

12. The semiconductor nanocrystal composition of claim 1, wherein the organic additive comprises octyl amine, oleyl amine, hexadecyl amine, dioctyl amine, didecyl amine, dioctyl phosphine, trioctyl phosphine, dioctyl phosphine oxide, trioctyl phosphine oxide, or a combination thereof.

13. A semiconductor nanocrystal-polymer composite comprising:
a semiconductor nanocrystal,
an organic additive, and
a polymerization product of at least one polymerizable substance selected from a polymerizable monomer, a polymerizable oligomer, and a combination thereof,
wherein the organic additive comprises a primary amine having one C8 to C30 alkyl or alkenyl group, a secondary amine having two C8 to C30 alkyl or alkenyl groups, a tertiary amine having three C8 to C30 alkyl or alkenyl groups, a primary phosphine having one C8 to C30 alkyl or alkenyl group, a secondary phosphine having two C8 to C30 alkyl or alkenyl groups, a tertiary phosphine having three C8 to C30 alkyl or alkenyl groups, a primary phosphine oxide having one C8 to C30 alkyl or alkenyl group, a secondary phosphine oxide having two C8 to C30 alkyl or alkenyl groups, a tertiary phosphine oxide having three C8 to C30 alkyl or alkenyl groups, and
wherein the composite has a haze of greater than or equal to 40%.

14. The semiconductor nanocrystal-polymer composite of claim 13, wherein the composite is in the form of a film.

15. The semiconductor nanocrystal-polymer composite of claim 13, wherein the semiconductor nanocrystal comprises a Group II-VI compound, a Group III-V compound, a Group IV-VI compound, a Group IV element or compound, or a combination thereof.

16. The semiconductor nanocrystal-polymer composite of claim 13, wherein the semiconductor nanocrystal emits a green light or a red light.

17. The semiconductor nanocrystal-polymer composite of claim 13, further comprising an inorganic oxide selected from silica, alumina, titania, zirconia, zinc oxide, and a combination thereof.

18. The semiconductor nanocrystal-polymer composite of claim 13, wherein composite has a haze of 45% to 95%.

19. The semiconductor nanocrystal-polymer composite of claim 13, wherein an amount of the organic additive in the semiconductor nanocrystal composite is 0.05% by weight to 10% by weight based on the total weight of the polymerizable substance.

20. The semiconductor nanocrystal-polymer composite of claim 13,
wherein the polymerizable monomer comprises a combination of a first monomer comprising at least two thiol groups at its terminal ends and a second monomer having at least two carbon-carbon unsaturated bonds at its terminal ends, an acrylate monomer, a methacrylate monomer, a urethane (meth)acrylate monomer, an epoxy monomer, a silicone monomer, or a combination thereof, and
wherein the polymerizable oligomer comprises an acrylate oligomer, a methacrylate oligomer, a urethane (meth)acrylate oligomer, an epoxy oligomer, a silicone oligomer, or a combination thereof.

21. A backlight unit for a liquid crystal display, comprising:
a LED light source; and
a light conversion layer disposed separately from the LED light source to convert light emitted from the LED light source to white light and provide the white light to a liquid crystal panel,
wherein the light conversion layer comprises the semiconductor nanocrystal-polymer composite of claim 13.

22. The backlight unit for a liquid crystal display of claim 21, wherein the light conversion layer comprises:
the semiconductor nanocrystal-polymer composite film; and
at least one of a first polymer film and a second polymer film disposed on at least one surface of the nanocrystal-polymer composite film,
wherein the first polymer film and the second polymer film each independently comprises a polyester, a cyclic olefin polymer, a polymerization product of a first monomer comprising at least two thiol groups, each located at the terminal ends of the first monomer, and a second monomer comprising at least two unsaturated carbon-carbon bonds, each located at the terminal ends of the second monomer, or a combination thereof.

23. The backlight unit for a liquid crystal display of claim 22, wherein at least one of the first polymer film and the second polymer film further comprises an inorganic oxide.

24. The backlight unit for a liquid crystal display of claim 22, wherein at least one of the first polymer film and the second polymer film has an uneven surface pattern on a side opposite to the light conversion layer.

25. The semiconductor nanocrystal composition-polymer composite of claim 13, wherein the organic additive comprises octyl amine, oleyl amine, hexadecyl amine, dioctyl amine, didecyl amine, dioctyl phosphine, trioctyl phosphine, dioctyl phosphine oxide, trioctyl phosphine oxide, or a combination thereof.

* * * * *